United States Patent
Harada (10) Patent No.: US 12,499,463 B2
(45) Date of Patent: Dec. 16, 2025

(54) COMMODITY REGISTRATION SYSTEM AND INFORMATION PROCESSING METHOD

(71) Applicant: Toshiba Tec Kabushiki Kaisha, Tokyo (JP)

(72) Inventor: Shintaro Harada, Izunokuni Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 56 days.

(21) Appl. No.: 18/410,810

(22) Filed: Jan. 11, 2024

(65) Prior Publication Data

US 2024/0354794 A1     Oct. 24, 2024

(30) Foreign Application Priority Data

Apr. 24, 2023  (JP) ................. 2023-070958

(51) Int. Cl.
- G06Q 30/0207   (2023.01)
- G06Q 20/20     (2012.01)
- G06Q 30/0601   (2023.01)
- G06V 10/25     (2022.01)

(52) U.S. Cl.
CPC ....... *G06Q 30/0207* (2013.01); *G06Q 20/208* (2013.01); *G06Q 30/0641* (2013.01); *G06V 10/25* (2022.01)

(58) Field of Classification Search
None
See application file for complete search history.

(56) References Cited

U.S. PATENT DOCUMENTS

| | | | |
|---|---|---|---|
| 10,169,752 B2 | 1/2019 | Katsumura | |
| 2019/0172039 A1* | 6/2019 | Kambara | G06V 20/52 |
| 2019/0236530 A1* | 8/2019 | Cantrell | G06V 40/23 |
| 2020/0034812 A1* | 1/2020 | Nemati | G06Q 20/14 |
| 2021/0042730 A1* | 2/2021 | Lee | G06Q 20/308 |
| 2021/0342807 A1* | 11/2021 | Meidar | G06Q 20/203 |
| 2021/0342876 A1 | 11/2021 | Haneda et al. | |
| 2022/0067689 A1* | 3/2022 | Guack | G06T 7/251 |
| 2022/0230216 A1* | 7/2022 | Buibas | G06V 10/454 |

(Continued)

FOREIGN PATENT DOCUMENTS

| | | |
|---|---|---|
| EP | 3989105 A1 | 4/2022 |
| JP | 2016-062547 A | 4/2016 |

*Primary Examiner* — Vincent M Cao
(74) *Attorney, Agent, or Firm* — Kim & Stewart LLP (57) ABSTRACT

According to embodiments, a commodity registration system comprises a processor configured to: acquire an image from a camera; attempt to detect in the acquired image, a commodity region showing a commodity, a hand region showing a purchaser's hand, and a seal region showing a discount seal attached to the commodity; when a detected commodity region is in contact with a detected hand region in the image, attempt to identify the commodity from the detected commodity region; when the detected commodity region is in contact with the detected hand region in the image and the seal region is detected from the image, attempt to identify the discount seal from the detected seal region; and when the detected commodity region is not in contact with the detected hand region and the seal region is detected from the image, attempt to identify the discount seal from the detected seal region.

20 Claims, 4 Drawing Sheets

(56) References Cited

U.S. PATENT DOCUMENTS

| | | | |
|---|---|---|---|
| 2023/0043615 A1* | 2/2023 | Saitoh | G07G 1/009 |
| 2023/0056327 A1* | 2/2023 | Brakob | G07G 1/0081 |
| 2023/0079388 A1* | 3/2023 | Fisher | G06T 7/0002 |
| | | | 382/103 |
| 2023/0120798 A1* | 4/2023 | Palande | G06V 10/25 |
| | | | 705/23 |
| 2023/0123576 A1* | 4/2023 | Gu | G06Q 20/38215 |
| | | | 705/74 |
| 2023/0267685 A1* | 8/2023 | Bay | G06V 10/82 |
| | | | 345/423 |
| 2023/0274560 A1* | 8/2023 | Bordone | G06Q 20/208 |
| | | | 382/103 |

* cited by examiner

FIG. 3

COMMODITY REGISTRATION SYSTEM AND INFORMATION PROCESSING METHOD

CROSS-REFERENCE TO RELATED APPLICATION

This application is based upon and claims the benefit of priority from Japanese Patent Application No. 2023-070958, filed Apr. 24, 2023, the entire contents of which are incorporated herein by reference.

FIELD

Embodiments described herein relate generally to a commodity registration system and an information processing method.

BACKGROUND

In a store at which commodities are displayed, a registration system is already proposed, in which a commodity held by a hand of a purchaser, to be placed in a shopping cart, is identified from an image, and the identified commodity is automatically registered as a commodity for purchase.

A technique of detecting a price discount sticker, seal, mark or the like (referred to in the following as a "seal") placed on the commodity, from the image, and applying a price discount represented by the price discount seal, to the identified commodity, is proposed.

However, while the commodity is held by the purchaser's hand, a situation frequently occurs where the price discount seal is covered by the hand such that the price discount seal is not shown in the image. In this situation, because the price discount seal is not shown in the image used for identifying the commodity, there is a concern that the price discount will not be appropriately applied.

Under such circumstances, it is desired to appropriately apply the price discount to the commodity.

DETAILED DESCRIPTION

An embodiment of a commodity registration system provides a technological improvement over other systems by appropriately applying a price discount to a commodity to which a price discount seal is attached, for retail point-of-sale systems or the like. The commodity registration system applies such price discount in situations in which other systems would fail to apply such price discount. An embodiment of an information processing method provides the same technological improvement.

According to embodiments, a commodity registration system includes a camera interface; and a processor configured to: acquire an image from a camera via the camera interface; attempt to detect in the acquired image, a commodity region in which at least a portion of a commodity is present, a hand region in which at least a portion of a purchaser's hand is present, and a seal region in which a discount seal attached to the commodity is present; when a detected commodity region is in contact with a detected hand region in the image, attempt to identify the commodity from the detected commodity region; when the detected commodity region is in contact with the detected hand region in the image and the seal region is detected from the image, attempt to identify the discount seal from the detected seal region; and when the detected commodity region is not in contact with the detected hand region and the seal region is detected from the image, attempt to identify the discount seal from the detected seal region if the commodity has been identified and registered for purchase but has not been associated with discount information.

Hereinafter, embodiments will be described using the drawings. Hereinafter, a transaction processing system will be described that configured to process a transaction involving a purchase of a commodity by a customer (purchaser) in a store.

Figure 1:
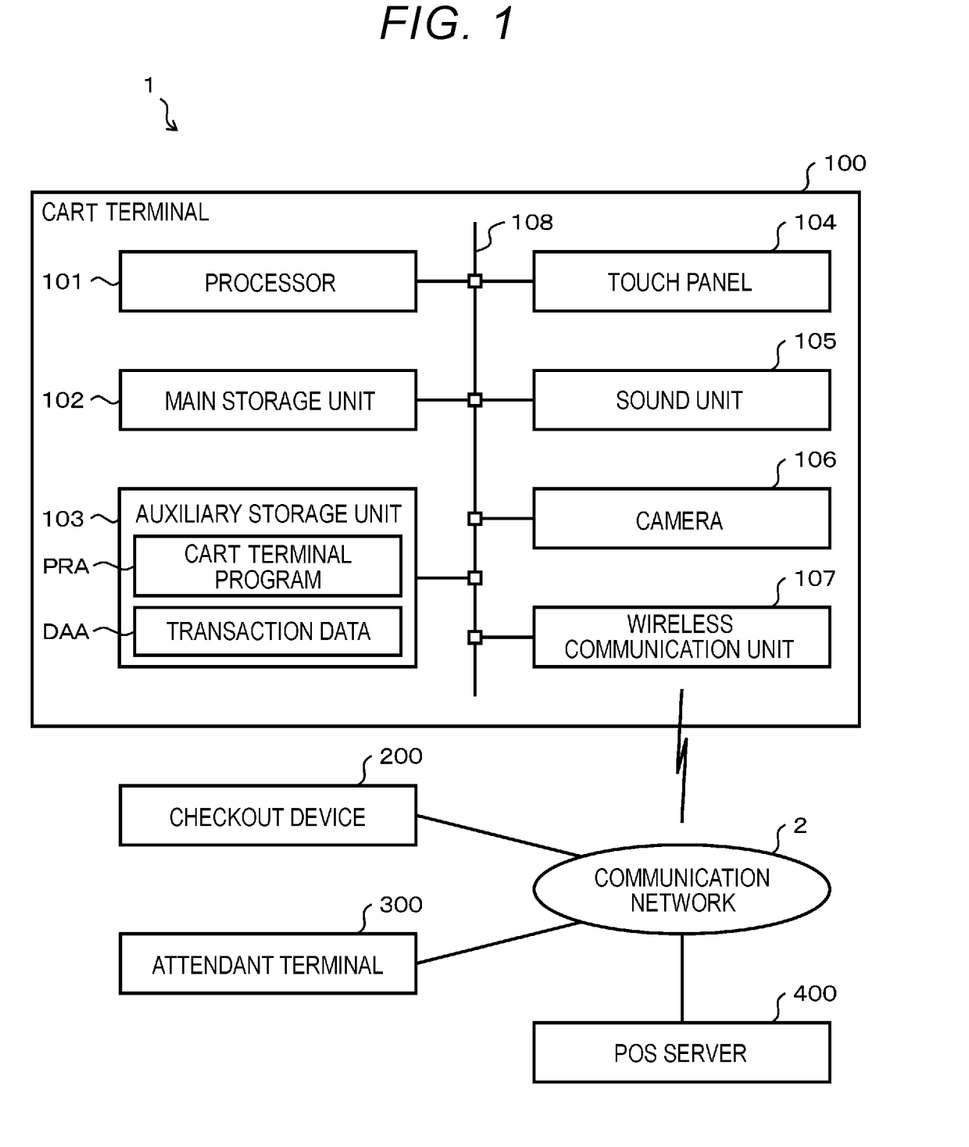
FIG. 1 is a block diagram illustrating a schematic configuration of a transaction processing system according to embodiments.

FIG. 1 is a block diagram illustrating a schematic configuration of a transaction processing system 1 according to the embodiment.

The depicted transaction processing system 1 includes a cart terminal 100, a checkout device 200, an attendant terminal 300, and a point-of-sale (POS) server 400 that communicate with each other via a communication network 2.

As the communication network 2, the Internet, a virtual private network (VPN), a local area network (LAN), a public communication network, a mobile communication network, and the like are used alone or used appropriately in combination. As the communication network 2, for example, a LAN and the Internet may be used in combination.

In general, the number of each of the cart terminal 100, the checkout device 200, the attendant terminal 300, and the POS server 400 in the transaction processing system 1 may be any value, but these are represented by only one of each component in FIG. 1 for sake of simplicity.

The cart terminal 100 is an information processing terminal attached to a shopping cart (hereinafter, referred to as a cart) in a store. The cart terminal 100 is provided to a customer who intends to purchase a commodity in a store, together with the cart. The cart terminal 100 is a terminal device that receives an input operation from the purchaser and executes a transaction process for registering a commodity for purchase by the purchaser as a "purchase commodity." The cart terminal 100 executes a process of identifying a commodity from an image including the commodity. Accordingly, the cart terminal 100 functions as commodity registration system.

The checkout device 200 is provided in the store and executes a checkout process relating to settlement of a transaction for the purchase commodity based on a price thereof and any associated price discount. The checkout device 200 receives an input operation from an operator during the checkout process. The operator of the checkout device 200 is typically the purchaser. However, a clerk may also be the operator of the checkout device 200 in some examples.

The attendant terminal 300 is an information processing terminal that is operated by the clerk. The attendant terminal 300 is a terminal device with a user interface relating to supporting work of the clerk relating to a transaction. The work of the clerk includes monitoring execution of the transaction and appropriately supporting the purchaser.

The POS server 400 is an information processing device that executes transaction processing for the cart terminal 100 and management processing for a sales transaction of a commodity.

The cart terminal 100 includes a processor 101, a main storage unit 102, an auxiliary storage unit 103, a touch panel 104, a sound unit 105, a camera 106, a wireless communication unit 107, a transmission line 108, and the like. The processor 101, the main storage unit 102, the auxiliary storage unit 103, the touch panel 104, the sound unit 105, the camera 106, and the wireless communication unit 107 communicate with each other via the transmission line 108.

The processor 101 is one or more central processing units (CPUs) of the cart terminal 100. The processor 101 executes information processing for controlling each unit of the cart terminal 100 to implement various functions of the cart terminal 100 according to an information processing program such as an operating system or an application program.

The main storage unit 102 includes read-only memory (ROM) and random-access memory (RAM). The main storage unit 102 stores a part of the information processing program in the ROM. The main storage unit 102 also stores data required for the processor 101 to execute a process of controlling each unit of the cart terminal 100, in the ROM or the RAM. The main storage unit 102 uses the RAM as a work area for the processor 101.

As the auxiliary storage unit 103, for example, an electric erasable programmable read-only memory (EEPROM), a hard disk drive (HDD), a solid-state drive (SSD), or another peripheral storage device can be used. The auxiliary storage unit 103 stores data used by the processor 101 to execute various processes, and stores data generated by processes of the processor 101. The auxiliary storage unit 103 may also store the above-described information processing program. Specifically, in embodiments described herein, the auxiliary storage unit 103 stores a cart terminal program PRA as the information processing program. The cart terminal program PRA is an application program where the procedure of the transaction process of the cart terminal 100 is included. The auxiliary storage unit 103 also stores transaction data DAA. The transaction data DAA is data representing the content of a transaction.

The touch panel 104 displays a screen for showing information to the operator of the cart terminal 100. The touch panel 104 accepts as input, an instruction based on the operator's touch operation on the screen.

The sound unit 105 outputs a sound for various guides and for warnings. As the sound unit 105, for example, various well-known sound devices such as a speech synthesis device and a buzzer are used alone or in combination.

The camera 106 provides an image for which a photographing range encompasses the entire internal space of a shopping basket of the cart. The camera 106 outputs image data representing the image acquired by photographing. The camera 106 may repeat photographing at a predetermined frequency (at predetermined fixed-time intervals) or may execute photographing in response to instructions from the processor 101. Instead of the camera 106, a camera that is affixed to the cart and connected to the cart terminal 100, may also be used.

The wireless communication unit 107 executes a communication process for wireless data communication via the communication network 2. As the wireless communication unit 107, an existing wireless communication device can be used. Instead of or in addition to the wireless communication unit 107, a communication unit that is connected to the communication network 2 in a wired manner, may also be used.

The transmission line 108 includes an address bus, a data bus, a control signal line, and the like, and delivers data and control signals transmitted to and received by the respective parts of the cart terminal 100.

As basic hardware of the cart terminal 100, for example, a tablet computer may be used. In general, the cart terminal 100 is distributed with the cart terminal program PRA already stored in the auxiliary storage unit 103. However, hardware without the cart terminal program PRA already stored in the auxiliary storage unit 103 or hardware with an application program of a same or similar type but of a different version already stored in the auxiliary storage unit 103 may be distributed separately from the cart terminal program PRA and later combined with the cart terminal program PRA. The cart terminal 100 may be configured by writing the cart terminal program PRA to the auxiliary storage unit 103. The cart terminal program PRA can be distributed through communication via a network or provided as a removable recording medium such as a magnetic disk, a magneto-optical disk, an optical disk, or semiconductor memory.

Figure 2:
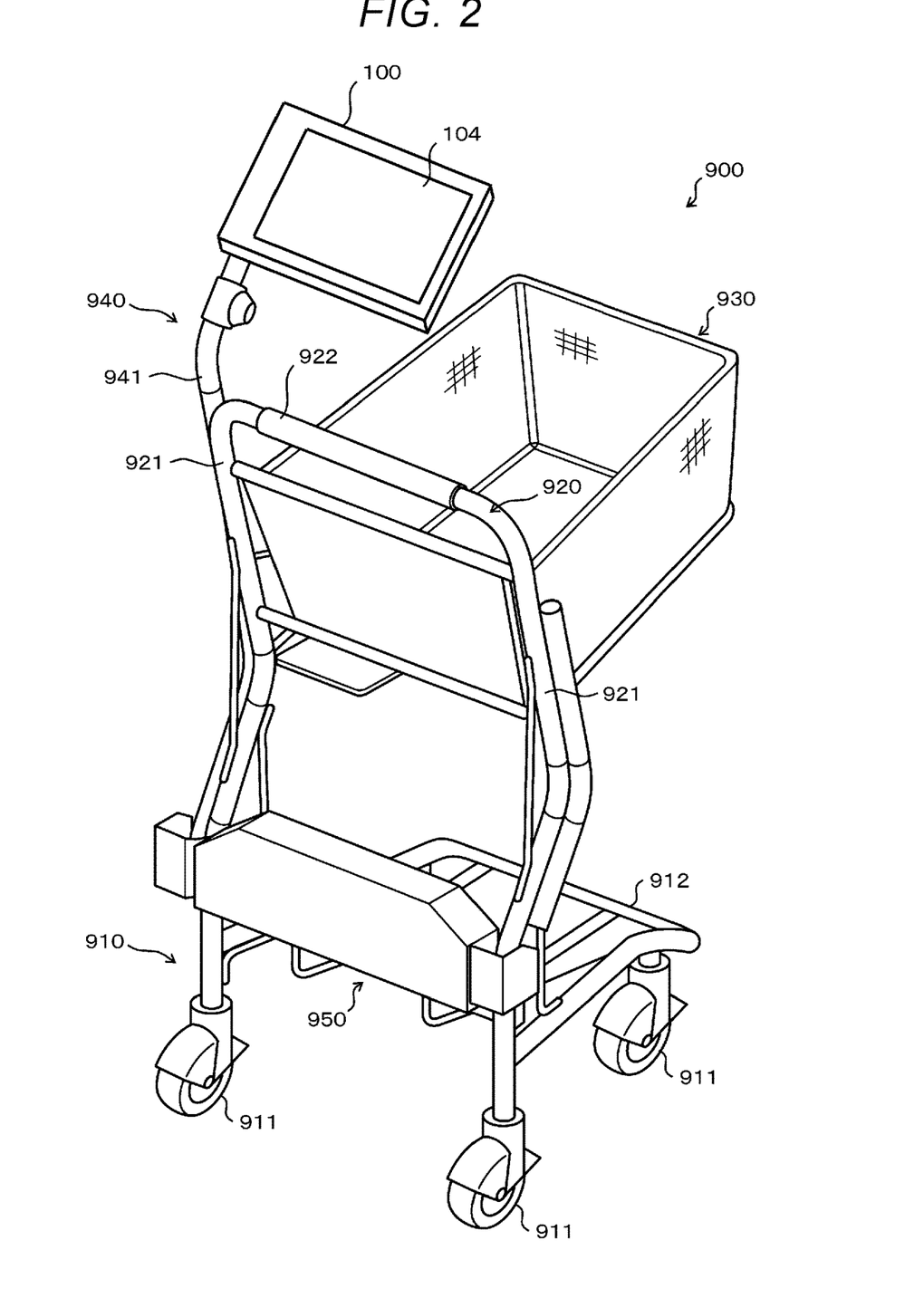
FIG. 2 is a perspective view illustrating a cart terminal attached to a cart.

FIG. 2 is a perspective view illustrating a cart terminal 100 attached to a cart 900.

A cart 900 includes a caster portion 910, a handle frame portion 920, a basket portion 930, a support portion 940, and a battery case 950.

The caster portion 910 includes four wheels 911 for smoothly moving the cart 900 on a floor. The wheels 911 are attached to a frame 912, and the wheels 911 are rotatable around an axis in the vertical direction.

The handle frame portion 920 includes a pair of longitudinal frames 921 and a handle bar 922. The longitudinal frames 921 stand on two wheels of the caster portion 910. The handle bar 922 is connected to upper ends of the longitudinal frames 921.

The basket portion 930 extends horizontally from an intermediate portion of the handle frame portion 920. The basket portion 930 has a basket shape with an opening into which a commodity can be placed from above, and functions as a container for storing a commodity.

The support portion 940 includes a pole 941. The pole 941 is attached to one longitudinal frame 921 such that a tip of the pole 941 is positioned above the handle bar 922. The above-described cart terminal 100 is attached to the tip portion of the pole 941. As a result, the support portion 940 supports the cart terminal 100 as illustrated in FIG. 2. The camera 106 of the cart terminal 100 is provided on a surface opposite to the surface where the touch panel 104 is provided. Thus, the camera 106 can photograph the basket portion 930 from a bird's-eye view.

The battery case 950 is attached between the longitudinal frames 921 on the lower end of the handle frame portion 920. The battery case 950 includes a battery used as an external power supply of the cart terminal 100.

Next, an operation of the transaction processing system 1 configured as described above will be described. The content of various processes is merely exemplary, and changes in the order of parts of the processing, omissions of parts of the processing, and additions of processing can be appropriately made. In the following description, for ease of understanding the specific operations of embodiments of the present disclosure, parts of processes may not be described. For example, if a certain type of error occurs, a process for dealing with such an error may be executed. As another example, in various standby states, if an event occurs that is different from an event to be described, the transaction processing system 1 may proceed to a process corresponding to the event that occurred.

A customer in a store, that is, a person (purchaser) who wants to purchase a commodity that is displayed for sale in the store, executes a predetermined operation on the cart terminal 100 to start using the cart terminal 100, which was previously in an unused state. After the operation is executed, the processor 101 starts a transaction process based on the cart terminal program PRA.

Figure 3:
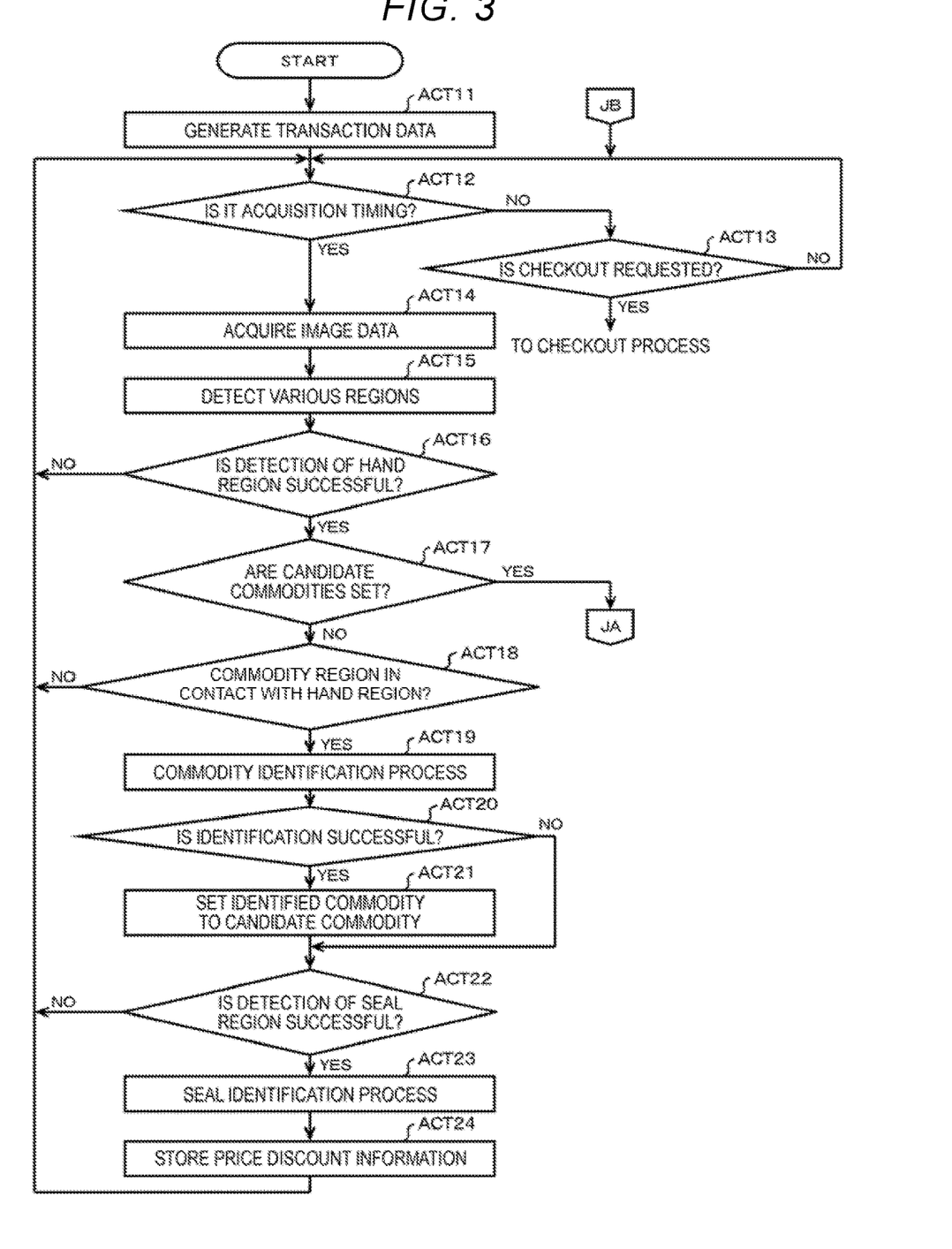
FIG. 3 is a flowchart illustrating a transaction process.
Figure 4:
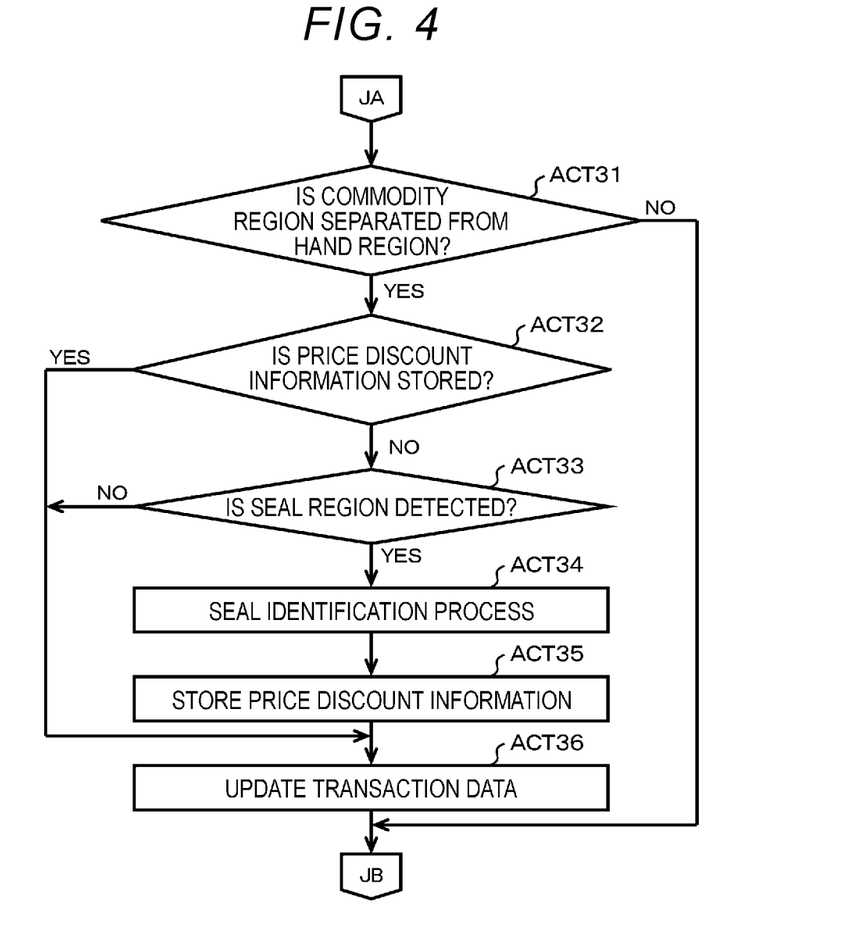
FIG. 4 is a flowchart illustrating the transaction process.

FIGS. 3 and 4 are flowcharts illustrating the transaction process.

In ACT 11 (FIG. 3), the processor 101 generates new transaction data DAA regarding a new (target) transaction. Specifically, the processor 101 sets or selects a new transaction code different from a previous transaction code according to a predetermined rule, generates the new transaction data DAA that includes the transaction code but does not include commodity information at the moment, and stores the generated new transaction data DAA in the auxiliary storage unit 103.

In ACT 12, the processor 101 checks whether it is an acquisition time for an image (a time to acquire an image). If not, the processor 101 determines NO and proceeds to ACT 13. The acquisition time may be immediately after transition from ACT 11 to ACT 12 or after predetermined fixed-time intervals. The acquisition time may be appropriately set by a developer of the cart terminal program PRA. It should be noted that the acquisition time should occur at least once per commodity to be purchased, preferably multiple times per commodity when a commodity is being placed in the basket portion 930 and passing through the photographing range of the camera 106.

In ACT 13, the processor 101 checks whether checkout has been requested. If not, the processor 101 determines NO and returns to ACT 12.

Thus, in ACT 12 and ACT 13, the processor 101 waits until it is an acquisition time or checkout is requested.

If it is the acquisition time, the processor 101 determines YES in ACT 12 and proceeds to ACT 14.

In ACT 14, the processor 101 acquires image data output by the camera 106. For example, if the camera 106 repeats photographing at a predetermined frequency, the processor 101 acquires image data from the camera 106 based on the latest photographing. Additionally or alternatively, if the camera 106 executes photographing in response to an instruction from the processor 101, the processor 101 instructs the camera 106 to execute photographing and acquires image data output by the camera 106, which executes photographing in response to the instruction. The processor 101 stores the acquired image data in the main storage unit 102 or the auxiliary storage unit 103. Thus, by the processor 101 executing information processing based on the cart terminal program PRA, the cart terminal 100 functions as an acquisition unit that acquires an image represented by image data.

In ACT 15, in the image data, the processor 101 attempts to detect each of: a purchaser's hand in a region where the purchaser's hand is included (hereinafter, referred to as a hand region), a commodity in a region where the commodity is included (hereinafter, referred to as a commodity region), and a price discount seal in a subregion of the commodity region where a price discount seal is included (hereinafter, referred to as a seal region). Each of the regions can be detected by applying deep learning to the image using a convolutional neural network (CNN), a well-known method to the image using graph cuts, or the like, and the methods are not limited thereto. A price discount seal may be attached to each of a plurality of commodities, and for each such commodity, represents a price reduction or discount to be applied to an original unit price of the commodity. There may be a plurality of types of price discount seals, each representing different price discount information. The price discount information represented by a price discount seal includes (1) information for identifying a commodity to which a price reduction or discount is to be applied and (2) a price reduction amount or a discount rate to be applied to the identified commodity.

Thus, by the processor 101 executing information processing based on the cart terminal program PRA, the cart terminal 100 functions as a detection unit for a hand region, a commodity region, and a seal region.

In ACT 16, the processor 101 checks whether the hand region was detected in ACT 15 (whether the hand region is shown in an acquired image). If not, the processor 101 determines NO in ACT 16 and returns to the standby state of ACT 12 and ACT 13.

The purchaser locates a purchase commodity in a selling area of the store. The purchaser uses their hand to pick up the purchase commodity and places the commodity in the basket portion 930. While placing the purchase commodity in the basket portion 930, the purchaser's hand enters the photographing range of the camera 106 and is photographed in an image represented by image data created and output by the camera 106. Even if it is the acquisition time, the processor 101 does not detect the hand region in ACT 15 until the purchaser places a commodity in the basket portion 930 as such. Until then, the processor 101 repeatedly determines NO in ACT 16 and returns to the standby state of ACT 12 and ACT 13. If the purchaser places the commodity in the basket portion 930 such that their hand is photographed in the image, the processor 101 detects the hand region in ACT 15. Upon such detection, the processor 101 determines YES in ACT 16 and proceeds to ACT 17.

In ACT 17, the processor 101 checks whether a commodity has been set as a candidate to be registered (hereinafter, referred to as a candidate commodity). If not, the processor 101 determines NO in ACT 17 and proceeds to ACT 18.

In ACT 18, assuming the commodity region was detected in ACT 15 (assuming the commodity region is shown in an acquired image), the processor 101 checks whether the detected commodity region in contact with the detected hand region. If not, the processor 101 determines NO in ACT 18 and returns to the standby state of ACT 12 and ACT 13. However, when the purchaser picks up the commodity with their hand and places the commodity in the basket portion 930, the detected commodity region will be in contact with the detected hand region, so the processor 101 determines YES in ACT 18 and proceeds to ACT 19.

In ACT 19, the processor 101 executes a commodity identification process. The commodity identification process identifies the commodity based on the detected commodity region. For the commodity identification process deep learning may be applied using a CNN suitable for image recognition. Alternatively, optical character recognition (OCR) or characteristic matching can be used, and the possible methods are not limited thereto. Thus, by the processor 101 executing information processing based on the cart terminal program PRA, the cart terminal 100 functions as an identification unit.

In ACT 20, the processor 101 checks whether the identification was successful in ACT 19. If so, the processor 101 determines YES and proceeds to ACT 21.

In ACT 21, the processor 101 sets the commodity identified in ACT 19 as a candidate commodity. Next, the processor 101 proceeds to ACT 22. If the identification was not successful in ACT 19, the processor 101 determines NO in ACT 20, skips ACT 21, and proceeds to ACT 22.

In ACT 22, the processor 101 checks whether the seal region was detected in ACT 15 (whether the seal region is shown within the commodity region of an acquired image). If not, e.g., because the seal region is obscured in the acquired image such as by the purchaser's hand, the processor 101 determines NO in ACT 22 and returns to the standby state of ACT 12 and ACT 13. However, if the seal region was detected in ACT 15, the processor 101 determines YES in ACT 22 and proceeds to ACT 23.

In ACT 23, the processor 101 executes a seal identification process. The seal identification process identifies a price discount seal shown in the detected seal region and a type of the price discount seal. As the seal identification process, deep learning may be applied using a CNN suitable for image recognition. Alternatively, OCR or characteristic matching can be applied, and the methods are not limited thereto. Different price discount information is represented by different types of price discount seals. Therefore, by identifying the type of the price discount seal in the detected seal region, specific price discount information is determined. Thus, by the processor 101 executing information processing based on the cart terminal program PRA, the cart terminal 100 functions as a first determination unit.

In ACT 24, the processor 101 stores the price discount information represented by the identified type of the price discount seal, in the main storage unit 102 or in the auxiliary storage unit 103. Next, the processor 101 returns to the standby state of ACT 12 and ACT 13.

If the processor 101 returns to the standby state of ACT 12 and ACT 13 after setting the candidate commodity in ACT 21, at the next acquisition time, the processor 101 determines YES in both of ACT 16 and ACT 17 and proceeds to ACT 31 (FIG. 4).

In ACT 31, the processor 101 checks whether a detected commodity region in a most recently acquired image is separated from (not in contact with) a detected hand region of the acquired image.

If the purchaser is still holding the commodity, then the detected hand region and the detected commodity region will be in contact with each other in the most recently acquired image. Therefore, the processor 101 determines NO in ACT 31 and returns to the standby state of ACT 12 and ACT 13 in FIG. 3. Accordingly, In a situation where the candidate commodity has been set in ACT 21 in FIG. 3, the processor 101 waits until the purchaser's hand is no longer touching the commodity. After the purchaser places the commodity in the basket portion 930 (thereby separating their hand from the commodity), a detected commodity region in the next acquired image will be separated from a detected hand region. Then, the processor 101 determines YES in ACT 31 in FIG. 4 and proceeds to ACT 32.

In ACT 32, the processor 101 checks whether price discount information corresponding to the commodity has been stored in ACT 24 in FIG. 3. If not, the processor 101 determines NO and proceeds to ACT 33 in FIG. 4.

In ACT 33, the processor 101 checks whether the seal region was detected in ACT 15 in FIG. 3 (whether the seal region is shown in an acquired image). If so, the processor 101 determines YES and proceeds to ACT 34 in FIG. 4.

In ACT 34, the processor 101 executes the seal identification process, as in ACT 23 in FIG. 3. Thus, by the processor 101 executing information processing based on the cart terminal program PRA, the cart terminal 100 functions as a second determination unit.

In ACT 35, the processor 101 stores price discount information represented by a type of a price discount seal identified in ACT 34, in the main storage unit 102 or in the auxiliary storage unit 103. Next, the processor 101 proceeds to ACT 36. Returning to ACT 32, if the price discount information has already been stored in ACT 24 in FIG. 3, the processor 101 determines YES in ACT 32, skips ACT 33 to ACT 35, and proceeds to ACT 36. Returning to ACT 33, if the seal region was not detected in ACT 15 in FIG. 3, the processor 101 determines NO in ACT 33, skips ACT 34 and ACT 35, and proceeds to ACT 36.

In ACT 36, the processor 101 registers the candidate commodity as a purchase commodity by updating the transaction data DAA to include a commodity code for identifying the candidate commodity. If price discount information was stored in ACT 24 in FIG. 3 or in ACT 35 in FIG. 4, the processor 101 registers the candidate commodity by updating the transaction data DAA to include the price discount information in a manner that associates the price discount information with the commodity code. Thus, by the processor 101 executing information processing based on the cart terminal program PRA, the cart terminal 100 functions as a registration unit. Next, the processor 101 returns to the standby state of ACT 12 and ACT 13 in FIG. 3.

After registering of the purchase commodity in ACT 36, the purchaser executes a predetermined operation for instructing the start of checkout using the touch panel 104. Accordingly, the processor 101 determines YES in ACT 13 in FIG. 3 and proceeds to a checkout process. The checkout process may be the same process as that of an existing card POS system. For example, the processor 101 may, as the checkout process, transmit the transaction data DAA to the checkout device 200 through the communication network 2 for settling a transaction involving the purchase f one or more commodities based on prices thereof. Alternatively, if a settlement terminal is attached to the cart 900 and the settlement terminal is connected to the cart terminal 100, a process for executing credit card settlement or code settlement of such a transaction using the settlement terminal and the transaction data DAA, may be executed as the checkout process.

As described above, the cart terminal 100 identifies a commodity that is held by the purchaser's hand and that is then placed in the basket portion 930, based on an acquired image, and then registers the commodity as a purchase commodity. If a seal region is detected in the acquired image, the cart terminal 100 identifies a price discount seal therein. Otherwise, if a seal region is not detected, e.g., because the seal region is obscured in one acquired image such as by the purchaser's hand, the cart terminal 100 detects a seal region in a later acquired image, when the purchaser's hand is separated from the commodity. Upon detection of the seal region in the later image, the cart terminal 100 identifies the price discount seal therein. If the price discount seal is identified (at any time), the cart terminal 100 registers the purchase commodity by adding to the transaction DAA, price discount information represented by a type of the price discount seal, in association with the purchase commodity. Thus, even if the price discount seal is initially obscured by the purchaser's hand, as long as the price discount seal is later photographed in an image upon the commodity being separated from the purchaser's hand, a price discount based on the type of the price discount seal, is identified and then appropriately applied.

The embodiments can be modified in various ways as follows.

Some of the processes that are executed by the processor 101 in the above-described embodiments may be executed by the POS server 400, by another information processing device, or by a plurality of information processing devices. For example, the cart terminal 100 may execute only a user interface operation, and other processes may be executed by the POS server 400. Each of the acquisition unit, the detection unit, the identification unit, the f determination unit, the second determination unit, and the registration unit may be provided by another information processing device in the transaction processing system 1. For example, the POS server 400 may provide certain functions described above for cart terminal 100 in the transaction processing system 1.

The above processes be appropriately distributed to and processed by a plurality of information processing devices in the transaction processing system 1. In other words, in the above-described embodiments, the cart terminal 100 alone implements the functions of the commodity registration system. However, by distributing the processes between the cart terminal 100 and the POS server 400, the commodity registration system may be configured by a plurality of devices.

A part or all of the respective functions that are implemented by the processor 101 through information processing, can also or instead be implemented by hardware such as a logic circuit that executes information processing that is not based on a program. Each of the respective functions can also be implemented by a combination of hardware and software.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity registration system, comprising:
    a camera interface; and
    a processor configured to:
        acquire a first image from a camera via the camera interface;
        search in the first image for a commodity region in which a commodity is present, a hand region in which a purchaser's hand is present, and a seal region in which a discount seal attached to the commodity is present;
        when the commodity region and the hand region are detected from the first image, the detected commodity region is in contact with the detected hand region in the first image, and the seal region is obscured in the first image by the detected hand region: identify the commodity from the detected commodity region in the first image and register the commodity for purchase without associating the commodity with discount information represented by the discount seal;
        acquire a second image from the camera via the camera interface after acquiring the first image;
        search in the second image for the seal region; and
        when the detected commodity region is not in contact with the detected hand region in the second image and the seal region is detected from the second image, identify the discount seal from the detected seal region in the second image in response to the commodity being registered for purchase but not being associated with the discount information.

2. The commodity registration system of claim 1, further comprising:
    the camera, which is configured and positioned to create the first and second images by photographing the inside of a shopping cart in which the commodity is placed, wherein the camera photographs the inside of the shopping cart at the ends of predetermined fixed-time intervals.

3. The commodity registration system of claim 1, further comprising:
    the camera, which is configured and positioned to create the first and second images by photographing the inside of a shopping cart in which the commodity is placed, wherein the camera photographs the inside of the shopping cart in response to instructions from the processor.

4. The commodity registration system of claim 1, wherein the processor is further configured to:
    after successfully identifying the discount seal from the detected seal region in the second image, store the discount information and store, in association with the stored discount information, an identifier of the commodity.

5. The commodity registration system of claim 4, wherein the processor is further configured to:
    after storing the discount information and the identifier of the commodity, determine that a checkout process for a transaction has been requested, the transaction including purchase of the commodity, and a price reduction amount or a discount rate included by the discount information being applied to the purchase of the commodity.

6. The commodity registration system of claim 5, further comprising:
    a checkout device,
    wherein the processor is further configured to:
        in response to determining that the checkout process has been requested, transmit the stored discount information and the stored identifier of the commodity to the checkout device for settlement of the transaction.

7. The commodity registration system of claim 5, wherein the processor is further configured to:
    in response to determining that the checkout process has been requested, execute credit card settlement of the transaction using the stored discount information and the stored identifier of the commodity.

8. The commodity registration system of claim 1, further comprising:
    a shopping terminal that includes the processor and that is attached to a shopping cart; and
    a checkout device configured to settle a transaction for purchase of the commodity based on the discount information.

9. A commodity registration device, comprising:
    a camera interface; and
    a processor configured to:
        acquire a first image from a camera via the camera interface;

search in the first image for a commodity region in which a commodity is present, a hand region in which a purchaser's hand is present, and a seal region in which a discount seal attached to the commodity is present;

when the commodity region and the hand region are detected from the first image, the detected commodity region is in contact with the detected hand region in the first image, and the seal region is obscured in the first image by the detected hand region: identify the commodity from the detected commodity region in the first image and register the commodity for purchase without associating the commodity with discount information represented by the discount seal;

acquire a second image from the camera via the camera interface after acquiring the first image;

search in the second image for the seal region; and when the detected commodity region is not in contact with the detected hand region in the second image and the seal region is detected from the second image, identify the discount seal from the detected seal region in the second image in response to the commodity being registered for purchase but not being associated with the discount information.

10. The commodity registration device of claim 9, wherein the processor is further configured to:

after successfully identifying the discount seal from the detected seal region in the second image, store the discount information and store, in association with the stored discount information, an identifier of the commodity.

11. The commodity registration device of claim 10, wherein the processor is further configured to:

after storing the discount information and the identifier of the commodity, determine that a checkout process for a transaction has been requested, the transaction including purchase of the commodity, and a price reduction amount or a discount rate included by the discount information being applied to the purchase of the commodity.

12. The commodity registration device of claim 11, wherein the processor is further configured to:

in response to determining that the checkout process has been requested, transmit the stored discount information and the stored identifier of the commodity to a checkout device for settlement of the transaction.

13. The commodity registration device of claim 11, wherein the processor is further configured to:

in response to determining that the checkout process has been requested, execute credit card settlement of the transaction using the stored discount information and the stored identifier of the commodity.

14. An information processing method performed by a computer processor of a commodity registration device, the information processing method comprising:

acquiring a first image from a camera via a camera interface of the commodity registration device;

searching in the first image for a commodity region in which a commodity is present, a hand region in which a purchaser's hand is present, and a seal region in which a discount seal attached to the commodity is present;

when the commodity region and the hand region are detected from the first image, the detected commodity region is in contact with the detected hand region in the first image, and the seal region is obscured in the first image by the detected hand region: identifying the commodity from the detected commodity region in the first image and registering the commodity for purchase without associating the commodity with discount information represented by the discount seal;

acquiring a second image from the camera via the camera interface after acquiring the first image;

searching in the second image for the seal region; and when the detected commodity region is not in contact with the detected hand region in the second image and the seal region is detected from the second image, identifying the discount seal from the detected seal region in the second image in response to the commodity being registered for purchase but not being associated with the discount information.

15. The information processing method of claim 14, wherein the camera creates the first and second images by photographing the inside of a shopping cart in which the commodity is placed, and the camera photographs the inside of the shopping cart at the ends of predetermined fixed-time intervals.

16. The information processing method of claim 14, wherein the camera creates the first and second images by photographing the inside of a shopping cart in which the commodity is placed, and the camera photographs the inside of the shopping cart in response to instructions from the processor.

17. The information processing method of claim 14, further comprising:

after successfully identifying the discount seal from the detected seal region in the second image, storing the discount information and storing, in association with the stored discount information, an identifier of the commodity.

18. The information processing method of claim 17, further comprising:

after storing the discount information and the identifier of the commodity, determining that a checkout process for a transaction has been requested, wherein the transaction includes purchase of the commodity, and a price reduction amount or a discount rate included by the discount information is applied to the purchase of the commodity.

19. The information processing method of claim 18, further comprising:

in response to determining that the checkout process has been requested, transmitting the stored discount information and the stored identifier of the commodity to a checkout device for settlement of the transaction.

20. The information processing method of claim 18, further comprising:

in response to determining that the checkout process has been requested, executing credit card settlement of the transaction using the stored discount information and the stored identifier of the commodity.

* * * * *